US012707008B2

(12) United States Patent
Gyabaah et al.

(10) Patent No.: US 12,707,008 B2
(45) Date of Patent: Aug. 11, 2026

(54) TELEPHONE NUMBER VERIFICATION FOR USE WITH CALLER IDENTIFICATION SERVICE

(71) Applicant: Microsoft Technology Licensing, LLC, Redmond, WA (US)

(72) Inventors: Teddy Gyabaah, Redmond, WA (US); Russell Andrew Penar, Highlands Ranch, CO (US); Mykhailo Uliutin, Redmond, WA (US); Michele Kinsey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 18/603,877

(22) Filed: Mar. 13, 2024

(65) Prior Publication Data

US 2025/0294090 A1 Sep. 18, 2025

(51) Int. Cl.
*H04M 3/42* (2006.01)

(52) U.S. Cl.
CPC ... *H04M 3/42042* (2013.01); *H04M 3/42059* (2013.01)

(58) Field of Classification Search
CPC ......... H04M 3/42042; H04M 3/42059; H04M 3/42153; H04M 3/436; H04M 2203/6018; H04M 2203/6027; H04M 2203/6045
See application file for complete search history.

(56) References Cited

U.S. PATENT DOCUMENTS 10,771,624 B1 9/2020 Penar
11,968,330 B1 * 4/2024 Gayaldo ............... H04M 3/541
2004/0208301 A1 * 10/2004 Urban ...................... H04Q 3/72 379/142.17
2021/0337384 A1 10/2021 Synal
2024/0098176 A1 * 3/2024 Magnezi ................ G06F 21/32

FOREIGN PATENT DOCUMENTS

TW 201246900 A 11/2012

OTHER PUBLICATIONS

International Search Report and Written Opinion received for PCT Application No. PCT/US2025/013292, May 13, 2025, 13 pages.

* cited by examiner

*Primary Examiner* — Mazda Sabouri
(74) *Attorney, Agent, or Firm* — Schwegman Lundberg & Woessner, P.A.

(57) ABSTRACT

The present invention relates to techniques for verifying "alien" telephone numbers for use as caller ID numbers. The system provides a configuration portal for administrative users to establish caller ID settings, including the option to replace a default telephone number assigned to a user/device with an alternative, alien number. A verification process involves generating a secret code, which is then communicated to a designated individual at the alien number through an outbound call. The individual confirms control by providing the secret code. Alternatively, an API request is made to a verification service. The system supports various attestation methods, including SIP protocols, SHAKEN framework, and delegated certificates, to convey the authentication status to carriers handling the call routing. This ensures the integrity of caller identification and prevents caller ID spoofing, enhancing trust and security in telecommunication networks.

20 Claims, 7 Drawing Sheets

TELEPHONE NUMBER VERIFICATION FOR USE WITH CALLER IDENTIFICATION SERVICE

TECHNICAL FIELD

The present disclosure pertains to the technological domains of telecommunications and caller identification (ID) services. More specifically, it addresses systems and methods for verifying authority over an "alien" telephone number that is intended for use as a caller ID number. An "alien" telephone number, in this context, refers to a telephone number that is presented to a carrier for use as a caller ID number, despite that telephone number not being directly maintained or managed by that carrier.

BACKGROUND

In the field of telecommunications, the verification of caller identification (ID) is of paramount importance. In modern communication systems, the ability to present a caller ID telephone number that differs from the originating telephone number is a feature often utilized for legitimate business purposes. For instance, a company may prefer to display a main office telephone number on outgoing calls made from various other telephone numbers or extensions within the organization. However, this capability also opens the door to potential misuse, as it can be exploited for fraudulent activities. Malicious entities may spoof caller ID telephone numbers to masquerade as reputable sources, thereby deceiving call recipients and undermining the reliability of caller ID information. This practice not only erodes trust in telecommunication systems but also poses significant security risks and challenges for individuals and businesses alike.

The industry has recognized the need for robust mechanisms to verify the authenticity of caller ID information and has developed standards such as Signature-based Handling of Asserted information using toKENs and Secure Telephone Identity Revisited, (SHAKEN/STIR) to address this issue. These standards aim to provide a framework for communications service providers to certify the legitimacy of caller ID telephone numbers, thereby reducing the incidence of fraudulent calls. Despite these efforts, challenges persist, particularly when users wish to display an "alien" number—one that is not directly managed by the service provider configured to be handling outgoing calls. In such scenarios, communications service providers face difficulties in verifying whether the user has the legitimate right to use the alien telephone number as their caller ID telephone number. The lack of a standardized and reliable method for such verification hampers the effectiveness of anti-spoofing measures and leaves a gap in the security of caller ID systems.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
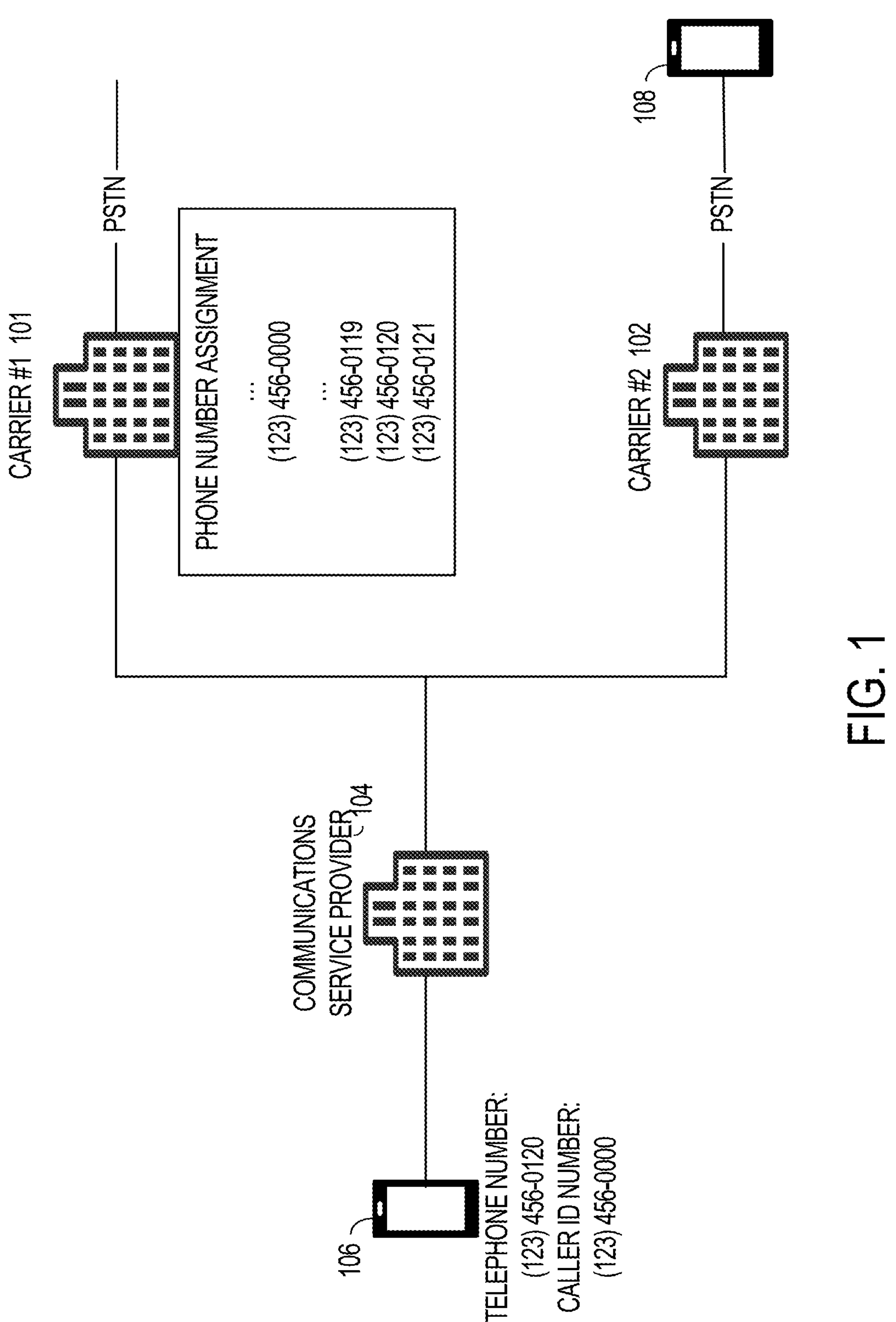
FIG. 1 is a diagram illustrating a telecommunications networking environment in which some embodiments of the present invention may be deployed.

Described herein are techniques for verifying the use of a telephone number that is to be displayed as a caller ID telephone number for outbound calls from a device, particularly when this telephone number is not under the purview of a communications service provider or carrier to which the device has been configured to route outbound calls. These methods involve a verification process that confirms a user's right to use the chosen telephone number, thereby ensuring the integrity and trustworthiness of the caller ID presented during calls. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

In the realm of telecommunications, a significant issue emerges when entities wish to assign to a device a caller ID telephone number that is not under the purview of the communications service provider or carrier that is configuring the device and handling its outbound calls. This "alien" number may be one that the entity has rights to display, but which is registered with or managed by a different carrier. The core of the problem lies in the ability of a communications service provider or carrier to verify the legitimacy of an entity's claim to use a particular telephone number as their caller ID telephone number, when the telephone number is allocated to or managed by a different carrier. This carrier, known as the "Service Provider Code (SPC) Holder" or more commonly referred to as the "Responsible Organization" (RespOrg) in the context of toll-free numbers, is the entity that has the number assigned to it within the industry's administrative databases. The term "Responsible Organization" specifically applies to the management of toll-free numbers, while for non-toll-free numbers, the term "Service Provider" or "Originating Service Provider" might be used to describe the carrier that has been allocated the telephone number and is responsible for its administration. The challenge for carriers and service providers is ensuring that any use of a telephone number by a third party, especially for caller ID purposes, is authorized by the rightful holder of that telephone number to prevent fraudulent or unauthorized usage. Without proper verification mechanisms, there is a risk that the caller ID feature could be exploited for fraudulent purposes, such as spoofing, where an incorrect or deceptive number is displayed to the call recipient.

This issue constitutes a technical problem because it requires a solution that can seamlessly integrate with existing telecommunications infrastructure and protocols. The solution must be capable of interfacing with various carrier systems, managing verification codes, and ensuring that the verification process is both secure and user-friendly. The solution should also align with industry standards, such as those set forth by the SHAKEN/STIR frameworks, which are designed to combat caller ID spoofing. Thus, the technical problem demands a system that can reliably verify control over "alien" telephone numbers for caller ID purposes without compromising the security or efficiency of the telecommunication services.

Consistent with some embodiments of the present invention, a technical solution to this problem is provided in the form of a method that allows a carrier or communications service provider to verify that an entity has the right to use a specific "alien" telephone number as their caller ID number. The process is initiated during the setup or configuration of a telephone device with a carrier or communications service provider, specifically when configuring the caller ID service for a particular telephone device. This configuration step determines how the caller ID will function and what phone number will be displayed to recipients during outgoing calls, even if the caller ID telephone number is different from the telephone number assigned to the device and when the caller ID telephone number is not directly under the purview of the carrier or communications service provider originating the call.

In the context of the present disclosure, the description of a telephone number as being "under the purview of a first carrier" is intended to convey that the telephone number has been formally and legally allocated to the first carrier by a regulatory government entity, for example, under the authority of the Federal Communications Commission (FCC) in the United States. This allocation is part of a structured process where the government entity assigns blocks of telephone numbers to carriers based on criteria like geographic region and carrier capacity. As the managing entity, the first carrier holds the authority to assign or allocate the telephone number to its customers, and is responsible for the activation, deactivation, and porting of the number in accordance with customer requests and regulatory compliance. The carrier's management responsibilities also extend to maintaining accurate and up-to-date records that reflect the status and assignment of the number for operational, billing, and regulatory purposes.

The carrier's authority over the telephone number includes the provision of services associated with the number, such as caller ID, call forwarding, voicemail, and other related telephony features. Additionally, the carrier may be tasked with implementing security measures to safeguard the integrity of the number, which involves deploying fraud prevention and anti-spoofing technologies that comply with industry standards, including the SHAKEN/STIR framework. This framework, known as Signature-based Handling of Asserted information using toKENs and Secure Telephone Identity Revisited, is designed to combat caller ID spoofing and ensure the reliability of caller identification across telecommunication networks. The carrier's purview, therefore, encompasses not only the legal control and assignment of the telephone number but also the responsibility to provide associated services and maintain the number's security and compliance with legal and industry mandates.

The technical problem becomes particularly pronounced when a telephone number, under the purview of a first carrier, is configured for use by and with a second carrier or communications service provider that may be offering over-the-top (OTT) services, such as Voice over Internet Protocol (VoIP) calling. In such scenarios, the second carrier or communications service provider does not have direct control over the telephone number, as it is not the entity that was originally allocated the number by the regulatory government entity. Instead, the second carrier or communications service provider may be utilizing the telephone number to provide enhanced communications services that operate over existing internet infrastructure, independent of the traditional telephony network managed by the first carrier. This situation often arises when businesses or individuals seek the advanced features and flexibility offered by OTT services, such as the integration of voice, video, and messaging, while still wanting to maintain their established telephone numbers that are recognized by their customers and are under the management of the first carrier. The challenge lies in the second carrier or communications service provider's ability to verify the right of their customers to use these "alien" telephone numbers, particularly for caller ID purposes, without direct access to the records and management systems of the first carrier. This verification is crucial to prevent the misuse of telephone numbers and to ensure that the caller ID displayed during VoIP calls accurately represents the calling party, thereby maintaining trust and security within the communication ecosystem.

Consistent with some embodiments, to facilitate the configuration of communications services, a carrier or communications service provider offers a configuration portal, which is accessible through a server-based computer system. This configuration portal is configured to present a variety of user interfaces that enable an administrator to manage and configure settings for user accounts, which impact the behavior of telephone devices, including the assignment of caller ID numbers. During the setup process, an administrator may encounter a situation where a device associated with a user account needs to be configured to display an "alien" number as its caller ID number-a number that is not directly managed by the carrier or communications service provider but is instead under the purview of a different carrier. To address this, the configuration portal is designed to work in conjunction with an Integrated Voice Response (IVR) unit. The IVR unit is tasked with placing an outbound telephone call to the alien number and engaging with the call recipient to verify their right to use the number for caller ID purposes. For example, the IVR unit might prompt the recipient with a message such as, "Please press one or say 'yes' to confirm that this telephone number can be used with caller ID, for the device having telephone number (123) 456-78980." This process ensures that only authorized entities are able to use specific telephone numbers as their caller ID, thereby maintaining the integrity of the caller identification system.

Consistent with some embodiments, to verify an entity's right to use a specified telephone number as the caller ID number with a user account and for a device, a carrier or communications service provider issues a secret code—a unique verification code—to the entity's administrator, for example, via the configuration portal. This secret code serves as a secret "handshake" that proves ownership or control over the telephone number in question. The carrier or communications service provider then causes an IVR unit to make an automated call to the "alien" telephone number, during which the person answering the call must provide the secret code. If the secret code provided by the person answering the call matches the one issued via the configuration portal, it confirms that the entity indeed has control over the telephone number, and the carrier or communications service provider can then activate the telephone number for use as the caller ID for the device.

In yet another embodiment of the invention, the process of verifying an "alien" telephone number for use as a caller ID is further enhanced by the introduction of a telephone number verification service, which is accessible via an API call over a network. This service, hosted by a carrier responsible for the alien number, provides a secure and automated means of confirming the entity's right to use the telephone number. When an administrator configures a user account to use an alien number as the caller ID through the configuration portal, the system generates an API request that includes an entity identifier, such as a Legal Entity Identifier (LEI), and sends it to the verification service along with the telephone number. The service, upon validating the entity's right to use the number, responds with an attestation or confirmation. The requesting carrier or communications service provider will then activate the caller ID policy and generate an attestation indicator that can be used with subsequent calls initiated by the user of the user account. This streamlined API-driven approach allows for a seamless integration with the carrier's existing infrastructure, enabling real-time verification and activation of the alien number for caller ID purposes without the need for manual intervention, thereby ensuring a secure and efficient process that aligns with industry standards for caller ID verification.

The technical solutions described herein are intended to be straightforward and secure, ensuring that only authorized users can display an "alien" number as their caller ID number. The technical solution helps to prevent fraudulent use of phone numbers and increases trust in the caller ID service, improving the functioning of the telecommunications service itself. By using this method, communications service providers can offer their customers the flexibility to choose their displayed phone number while maintaining the integrity of the calling system. Other aspects and advantages of the several embodiments of the present invention will be readily apparent from the description of the several figures that follows.

FIG. 1 provides a visual representation of a communications configuration scenario involving multiple carriers 101 and 102 and the use of an "alien" telephone number as a caller ID number. In this scenario, a telephone device 106 is associated with a communications service provider 104, which facilitates the management of outbound call settings for the device 106 through a configuration portal (not shown). The device 106 has been assigned a telephone number, specifically (123) 456-0120, for its outbound calls. However, for caller ID purposes, the device 106 has been configured to display a different number, (123) 456-0000, as its caller ID number when making outbound calls.

As depicted in FIG. 1, the device 106 is assigned both a telephone number and a caller ID number that are originally allocated by carrier #1 101, which is responsible for their maintenance and management. The caller ID number, (123) 456-0000, is not managed by the communications service provider 104 nor by carrier #2 102, which is the designated carrier for routing the device's outbound calls. Instead, this caller ID number is under the purview of carrier #1 101. The significance of using this particular caller ID number lies in its lack of direct association with device 106, service provider 104, or carrier #2. Therefore, within this context, the caller ID number is considered "alien" to both the communications service provider 104 and carrier #2 102, as it originates from an external source, carrier #1 101.

When an outbound call is initiated from the telephone device 106, the call is routed through carrier #2 102, which is responsible for placing the call onto the Public Switched Telephone Network (PSTN) towards the destination telephone 108. Carrier #2 102 faces a challenge in this setup: it has no direct means to verify the legitimacy of the caller ID number, (123) 456-0000, being used. This lack of verification capability raises concerns about whether the caller ID number is being used properly, that is, whether the entity making the call has the rightful ownership or authorization to use this number as their caller ID number.

This illustration highlights the technical problem of caller ID verification in a multi-carrier environment where a telephone number used for caller identification is "alien" to the carrier handling the outbound call. FIG. 1 underscores the need for a mechanism that would allow carrier #2 102 to confirm the proper use of the caller ID number, ensuring that it is rightfully owned and assigned by the entity represented by the communications service provider 104. Without such a mechanism, there is a risk of caller ID spoofing or misuse, which can lead to trust issues within the telecommunications ecosystem.

In the context of FIG. 1, the communications service provider 104 is depicted as an entity that facilitates the assignment and management of telephone numbers for use in telephony services. This communications service provider 104 can take on different forms depending on the service model and infrastructure. One possibility is that the communications service provider 104 is another carrier, which traditionally refers to a telecommunications entity that owns and operates its own network infrastructure and offers various telephony services, including the assignment of telephone numbers.

Alternatively, the communications service provider 104 may be a provider of Unified Communications (UC) services, often referred to as Unified Communications as a Service (UCaaS). UCaaS providers offer a suite of communication and collaboration tools that are delivered and accessed over the internet, typically through a cloud-based platform. These services integrate various communication methods, such as voice, video, messaging, and conferencing, into a cohesive system that can be used across multiple devices and locations.

UCaaS providers may not own traditional telecommunication network infrastructure but instead leverage existing networks to deliver their services. They often partner with traditional carriers to utilize their telephone numbers while providing the added value of unified communications features. In this scenario, the UCaaS provider manages the integration of these numbers into their platform, allowing users to make and receive calls with a telephone number provided by a traditional carrier but routed and enhanced through the UCaaS platform.

This flexibility allows businesses to choose a communications service provider that best fits their operational needs, whether it's a traditional carrier with its own network or a UCaaS provider that offers advanced communication features and the convenience of cloud-based services. Multiple carriers may be involved in the configuration and routing of outbound calls for several reasons, often related to the diverse needs and strategic choices of businesses and organizations. Listed below are a few of the many reasons why a first communications service provider may allow devices to use telephone numbers obtained from a first carrier while placing outbound calls with a second carrier:

- Cost Efficiency: Different carriers may offer varying pricing structures for different services. A business might find it more cost-effective to obtain telephone numbers from one carrier (Carrier #1) due to favorable rates or existing contracts, while another carrier (Carrier #2) might offer better rates for placing outbound calls or superior call quality.
- Geographic Presence: Some carriers have a stronger presence or better infrastructure in certain geographic regions. A business might use telephone numbers from a local carrier to appear local to that area but use a global carrier with a broader network for actual call routing to benefit from their extensive infrastructure.
- Redundancy and Reliability: Using multiple carriers can provide redundancy, ensuring that if one carrier experiences an outage or degradation in service, the business can still place calls through another carrier, thus maintaining business continuity.
- Feature Set: Different carriers may offer unique features or services that are beneficial to the business. For example, Carrier #1 might provide advanced analytics or call management features for the numbers they supply, while Carrier #2 might offer better international calling options or integration with cloud services.
- Regulatory Compliance: In some cases, regulatory requirements might dictate that a business must use telephone numbers from a local carrier. However, for actual call routing, especially for international calls, they might prefer to use a different carrier that specializes in international telecommunications.
- Customer Recognition: Businesses often want to maintain a consistent caller ID for branding purposes. They may use a well-known number from Carrier #1 but route calls through Carrier #2 for the aforementioned benefits. This way, customers recognize the calling number, which maintains trust and brand consistency.
- Portability and Flexibility: Telephone number portability allows businesses to retain their phone numbers even when switching service providers. A business may choose to keep its existing numbers from Carrier #1 due to their established presence but switch to Carrier #2 for outbound calls to take advantage of better services or deals.

Figure 2:
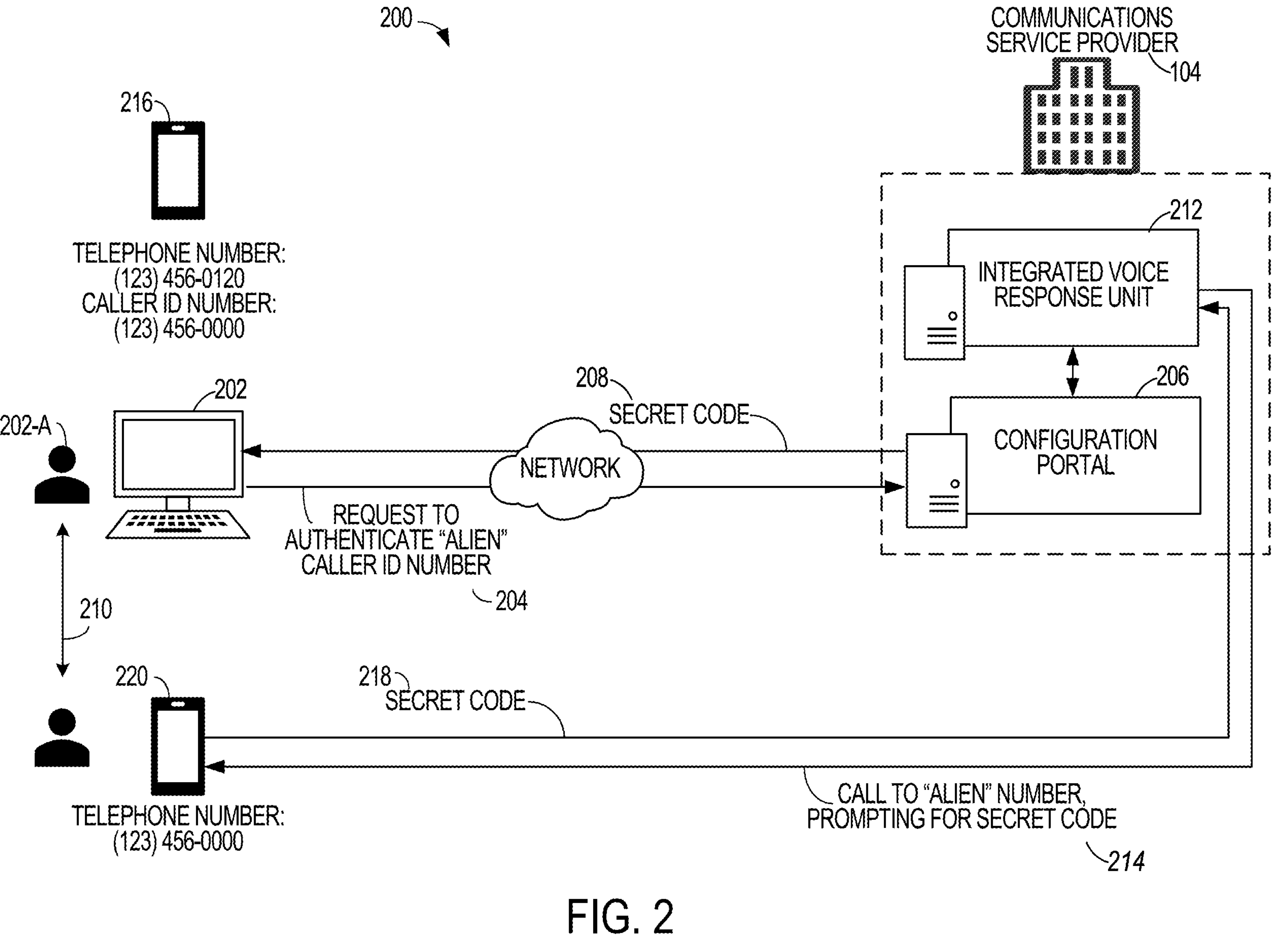
FIG. 2 is a diagram illustrating a data flow for a first group of techniques to verify the control over an alien telephone number, consistent with some embodiments.

FIG. 2 depicts the verification process for an "alien" caller ID number, which is facilitated through the use of a secret code or verification token, consistent with some examples. An administrative user 202-A, operating a computer 202, is engaged in setting up a telephone device 216 to use a caller ID number (e.g., (123) 456-0000) that is distinct from the device's assigned telephone number (e.g., (123) 456-0120) for making outbound calls. A telephone number is considered "alien" when it is allocated to and thus maintained and managed by a carrier that is different from the carrier configured to handle outbound calls from the device. In this scenario, the telephone device 216 may be configured to route calls through a first carrier, while the caller ID number is under the purview of a second carrier. Consequently, the caller ID number is deemed alien to the first carrier, as the first carrier does not have the responsibility for maintaining and managing the number.

The administrative user 202-A, interacting with a user interface of the configuration portal 206, initiates a request to verify the alien caller ID number, as indicated by reference line 204. In response to this request, the configuration portal 206 generates a secret code, which is then communicated over a network and displayed to the administrative user 202-A, as depicted by reference line 208. This secret code serves as a verification token to verify control over the alien caller ID number.

The secret code functions as a one-time verification token, typically comprising a series of digits or a simple alphanumeric phrase that confirms a user's right to use a chosen alien caller ID number. In some instances, the code is generated specifically to be inputted via a touch-tone dial pad, such as "528491," ensuring straightforward entry during the verification process. In other scenarios, the secret code might be a word or a short phrase, like "SecureCall" or "Verify123," which can be easily spoken and recognized when the recipient of the verification call responds. With some embodiments, the generation of the secret code is designed to accommodate both methods—numeric entry and voice response—depending on the administrative user's preference and the capabilities of the receiving device. For example, the configuration portal might generate the secret code using a random number generator, resulting in a sequence like "483920." Alternatively, the portal could create a passphrase combining letters and numbers, such as "CallID9x27," or it might use a more complex algorithm to produce a mixed-character code like "7bX29!tZ." The method of generation would ensure that each code is unique and time-sensitive, providing a secure means of verifying control over the alien caller ID number.

Subsequent to generating and displaying the secret code to the administrative user, the configuration portal 206 triggers an application executing on the Integrated Voice Response (IVR) unit 212 to place an outbound call to the alien telephone number, as represented by reference line 214. The triggering of this outbound call may be in response to the administrative user 202-A interacting with a user interface element (e.g., pressing a button or similar) presented via the user interface of the configuration portal 206. The user of the telephone device 220 to which the outbound call is directed, upon answering the call, is prompted by the IVR 212 to provide the secret code either verbally or via the telephone's dial pad.

When the user inputs the secret code, as shown by reference line 218, the IVR compares the received code with the secret code previously generated by the configuration portal 206. If the codes match, the system considers the alien number to be verified. Consequently, an attestation indicator or record is created and stored in association with the alien caller ID number, confirming its legitimacy for use. As explained below, this attestation indicator or record can be used to attest to the authenticity of the caller ID number when routing outbound calls from the telephone device to other carriers.

As indicated by the line with reference number 210, in instances where the administrative user 202-A can, the administrative user may share the secret code directly with the person who is expected to answer the outbound call directed to the alien number. However, in certain scenarios where the administrative user 202-A and the user of the telephone device 220 are not co-located, and thus the administrative user 202-A may not easily share the secret code with the user of the telephone device 220, alternative communication channels may be employed to convey the secret code to the user of the telephone device 220. For instance, the configuration portal 206 may facilitate the transmission of the secret code to the telephone device user through various means, including, but not limited to:

An instant messaging service integrated within a unified communications platform, allowing the administrative user to send the code directly to the user's messaging application.

An email or SMS message, where the configuration portal can automatically send the secret code to a pre-registered email address or mobile number associated with the user of the telephone device 220.

A secure web portal or mobile application, where the user can log in to retrieve the secret code in a protected environment.

A printed document or physical token, which can be handed over or mailed to the user if digital communication is not feasible or preferred.

These alternative methods ensure that the user of the telephone device 220 receives the secret code securely and can successfully complete the verification process, regardless of their physical proximity to the administrative user.

In instances where the alien caller ID number is assigned to an answering service or an Interactive Voice Response (IVR) system, the verification process requires additional steps to ensure that the outbound verification call reaches an individual who can provide the secret code. Since the initial response to the outbound call will be managed by an automated system rather than a person, the configuration portal must be equipped with functionality that allows the administrative user to guide the IVR unit 212, placing the outbound verification call 214, through the necessary steps to reach the appropriate party.

The configuration portal 206 may present the administrative user 202-A with an interface that includes options for specifying instructions for the IVR menu navigation. These instructions could include a sequence of digits to be entered, which correspond to the options presented by the answering service's or IVR's menu. For example, if the IVR unit receiving the verification communication or call 214 prompts callers to "press 1 for sales, press 2 for support," and the individual who can verify the number is in the support department, the administrative user would instruct the IVR to simulate pressing "2" to route the call correctly. This process ensures that even when an alien caller ID number is managed by an automated system, there is a reliable method for verifying the number by reaching a human respondent capable of completing the verification process.

In certain embodiments of the present invention, the successful verification of an alien telephone number through the disclosed process results in the generation of an attestation indicator or record that is intended to correspond with the highest level of attestation as defined by the SHAKEN framework. This highest level, known as "A-level attestation," signifies that the communications service provider has verified both the right of the calling party to use the telephone number and the association of that number with the calling party's account. By achieving this level of attestation for an alien number, the system provides the strongest assertion of legitimacy to other carriers and entities within the telecommunications network, thereby enhancing the reliability and trustworthiness of the caller ID information presented during outbound calls.

In certain embodiments, upon successful verification of the caller ID number, an attestation indicator or record is assigned a validity period during which the verification of the alien caller ID number is considered to be active. This temporal limitation on the attestation record's validity is a safeguard that accounts for the dynamic nature of telephone number assignments, which can be changed, ported, or otherwise modified over time. Once the validity period expires, the system requires a re-verification of the number to ensure continued accuracy and legitimacy of the caller ID representation. The process for re-verification might work as follows: as the expiration date approaches, the system automatically notifies the administrative user, prompting them to initiate a new verification process. The configuration portal then generates a new secret code and the verification steps are repeated, similar to the initial verification. If the re-verification is successful, a new attestation record is created with an updated validity period, thereby maintaining the integrity of the caller ID system and ensuring that the number in use is still under the rightful control of the entity making the outbound calls.

As illustrated and described in connection with FIG. 2, an administrator is shown to be configuring a device. However, in certain embodiments, the configuration settings, including the caller ID policy, are associated with a user account rather than being tied directly to the telephone device itself. This approach allows for greater flexibility and control over the use of the caller ID feature. When the user associated with the user account logs into a communication application installed on and executing at a telephone device, the caller ID policy comes into effect, influencing the behavior of the device during outbound calls. The communication application, through its integration with the configuration portal, retrieves the caller ID policy settings from the user account and applies them to the call session. This means that regardless of which device the user logs into, the outbound calls made via the communication application will display the caller ID number as specified in the user account's policy settings, ensuring consistency and adherence to the predetermined caller ID preferences across multiple devices.

Figure 3:
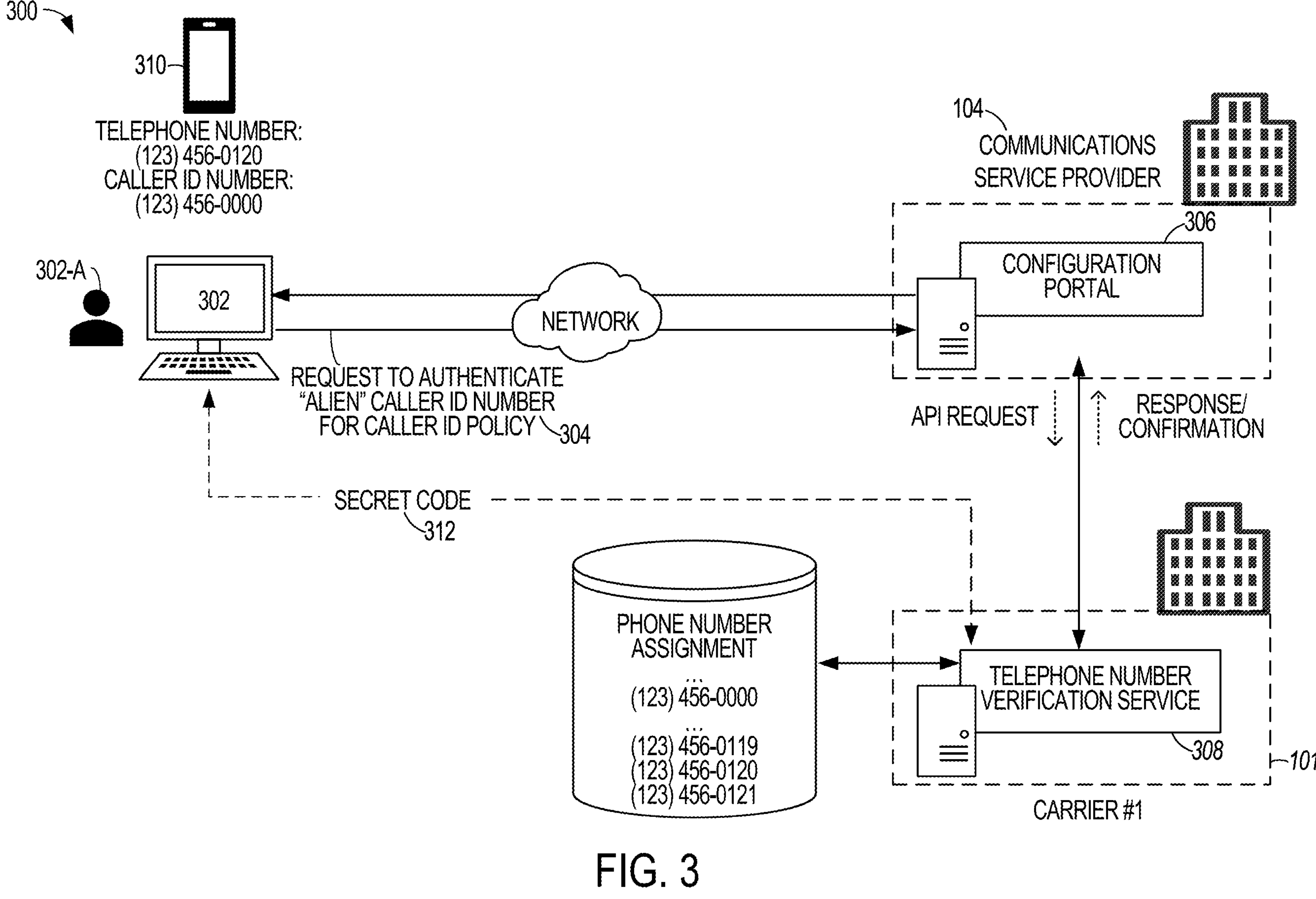
FIG. 3 is a diagram illustrating a data flow for a second group of techniques to verify the control over an alien telephone number, consistent with some embodiments.

FIG. 3 illustrates an embodiment of the invention that incorporates a telephone number verification service 308, enhancing the security and reliability of caller ID policies managed by a communications service provider 104, consistent with some examples. Consistent with this embodiment, an administrator 302-A, utilizing a client computer 302, engages with the configuration portal 306 of the communications service provider 104. Through this configuration portal 306, the administrator 302-A is able to define and manage caller ID policies that are to be applied to user accounts or specific devices. In the scenario depicted, the caller ID policy is being established to utilize a telephone number that was originally assigned to and is under the purview of carrier #1 101.

Upon setting the caller ID policy to use a telephone number managed by carrier #1 101, the administrator 302-A can initiate a telephone number verification request. This action triggers the configuration portal 306 to send an API request to the telephone number verification service 308. The API request is crafted to include an entity identifier, which may be a Legal Entity Identifier (LEI)—a unique, 20-character alphanumeric code that is used to identify distinct legal entities that engage in financial transactions. The LEI is a global standard, designed to provide clarity on the ownership structure of companies, thereby enhancing transparency in the marketplace. The entity identifier may be accessible to the configuration portal 306 via a customer data record (not shown) maintained by the communications service provider 104, or alternatively, the administrator 302-A may be prompted to input or otherwise specify the entity identifier as part of the interaction and work flow for requesting the verification of the telephone number.

The telephone number verification service 308 processes the API request by utilizing the entity identifier or the telephone number to retrieve a corresponding customer data record. If the customer data record confirms that the customer associated with the entity identifier is authorized to use the telephone number in question, the verification service 308 responds to the API request with a confirmation. This confirmation may also include an attestation indicator, which serves as a formal assertion of the customer's right to use the telephone number for caller ID purposes. However, in some instances, the configuration portal 306 will generate the attestation indicator based on the confirmation received from the telephone number verification service 308.

Once the configuration portal 306 receives this confirmation from the verification service, it proceeds to authorize and activate the caller ID policy for the designated user account(s). The portal may also associate the received attestation indicator with the user account(s), or it may generate its own attestation indicator based on the confirmation. This attestation indicator plays a role in subsequent communications, as it is used to validate the authenticity of the caller ID when a user, logged into a user account, initiates an outbound call.

When a user logs into the communications application on a telephone device using the relevant user account, the caller ID policy, along with the attestation indicator, is effectively "attached" to the telephone device. As the user initiates an outbound call, the attestation indicator is retrieved and, in some embodiments, incorporated into the header of the call setup signaling. This information is then conveyed to downstream carriers, enabling the terminating carrier to authenticate the caller ID before presenting the caller ID telephone number to the call recipient. This process ensures that the caller ID displayed is verified and trustworthy, thereby bolstering the integrity of the communication system as a whole.

To further enhance the security measures within the caller ID verification process, an optional optimization involves the use of a secret code 312, which may be generated and issued by the configuration portal 306 of the communications service provider 104. This secret code serves as an additional authentication factor, ensuring that the request for telephone number verification originates from an authorized administrator. The administrator 302-A is required to input this secret code into the configuration portal when setting up or modifying the caller ID policy for a user account or device. The secret code is then included in the API request, which is only processed by the telephone number verification service 308 when the secret code matches the one recognized by the telephone number verification service. Upon receipt of the API request, the verification service 308 validates the secret code against its records, ensuring that the request is legitimate and that the administrator is authorized to configure the caller ID policy for the telephone number. This validation step prevents unauthorized manipulation of caller ID settings and ensures that only verified numbers are used, thereby maintaining the integrity of the caller identification system.

Alternatively, the secret code 312 can be generated and provided directly to the administrator 302-A by the telephone number verification service 308 or a related service operated by carrier #1 101. In this scenario, the secret code acts as a unique identifier that links the administrator's verification request to specific customer records managed by carrier #1 101. When the administrator 302-A submits a verification request through the configuration portal, the secret code is included in the API request sent over the network to the telephone number verification service.

The telephone number verification service 308, upon receiving an API request, checks for the presence of the secret code. The service may be configured to process requests only if the secret code is recognized, thereby providing a gatekeeping function that filters out unauthorized or invalid verification attempts. In some instances, the secret code is associated with particular customer data records, allowing the telephone number verification service 308 to limit its search to those records linked to the received secret code. This focused approach ensures that the verification process is both secure and efficient, as it correlates the entity identifier and the telephone number with authenticated and relevant data.

The incorporation of the secret code into the verification process offers several advantages. It adds a robust layer of security by requiring a verifiable token that only authorized administrators possess. It streamlines the verification process by guiding the service to specific, pre-authorized records, thus speeding up the response time for confirmations. Moreover, it limits the exposure of sensitive data by confining the verification service's access to records associated with the secret code, enhancing data privacy and reducing the risk of data breaches. This optimization not only strengthens the security of the verification process but also upholds the integrity and reliability of the caller ID system for users and telecommunications providers alike.

An example of an API request is set forth below:

```
Content-Type: application/json; charset=utf-8
{
 "number": "12223334444",
 "number-range": "12223334446 - 12223335555",
 "customer": "LEI_guid",
 "secretCode": "Comm Service Povider generated code given to admin",
}
HTTP/1.1 200
Content-Type: application/json; charset=utf-8
Content-Length: foo
{
 "validated": "yes",
 "reportRequest": no, //support enforcement and monitoring
 "expiry": null, //carrier can say when customer is expected to release the
number, informs Comm Service Provider auth Governor-service.
}
```

In an alternative embodiment, the verification process is further simplified through the implementation of an "SMS delegate" option, which builds upon the API use-cases by incorporating an SMS component into the workflow. In this scenario, a carrier empowers their customer, who leases the alien telephone number, to designate a "delegate admin SMS contact." This feature allows external parties, such as the communications service provider, to discover and engage in an SMS-based dialogue with a single, authorized contact number to facilitate the verification of one or more alien telephone numbers that are managed by the carrier. An administrator provides the communications service provider with a secret key, which has been issued by the carrier, to unlock access to the delegate number.

Once the communications service provider has the secret key, it initiates an automated SMS dialogue with the delegate number, effectively streamlining the telephone number verification process. This dialogue may involve sending a verification request via SMS to the delegate number and receiving a response that includes a secret code or other forms of authentication tokens. The use of SMS for verification is particularly advantageous as it allows for rapid and direct communication, which can be essential for timely verification in dynamic business environments. This method not only simplifies the verification process but also provides a level of flexibility and convenience for administrators managing multiple alien telephone numbers, ensuring that the caller ID policies are securely and efficiently authenticated.

Figure 4:
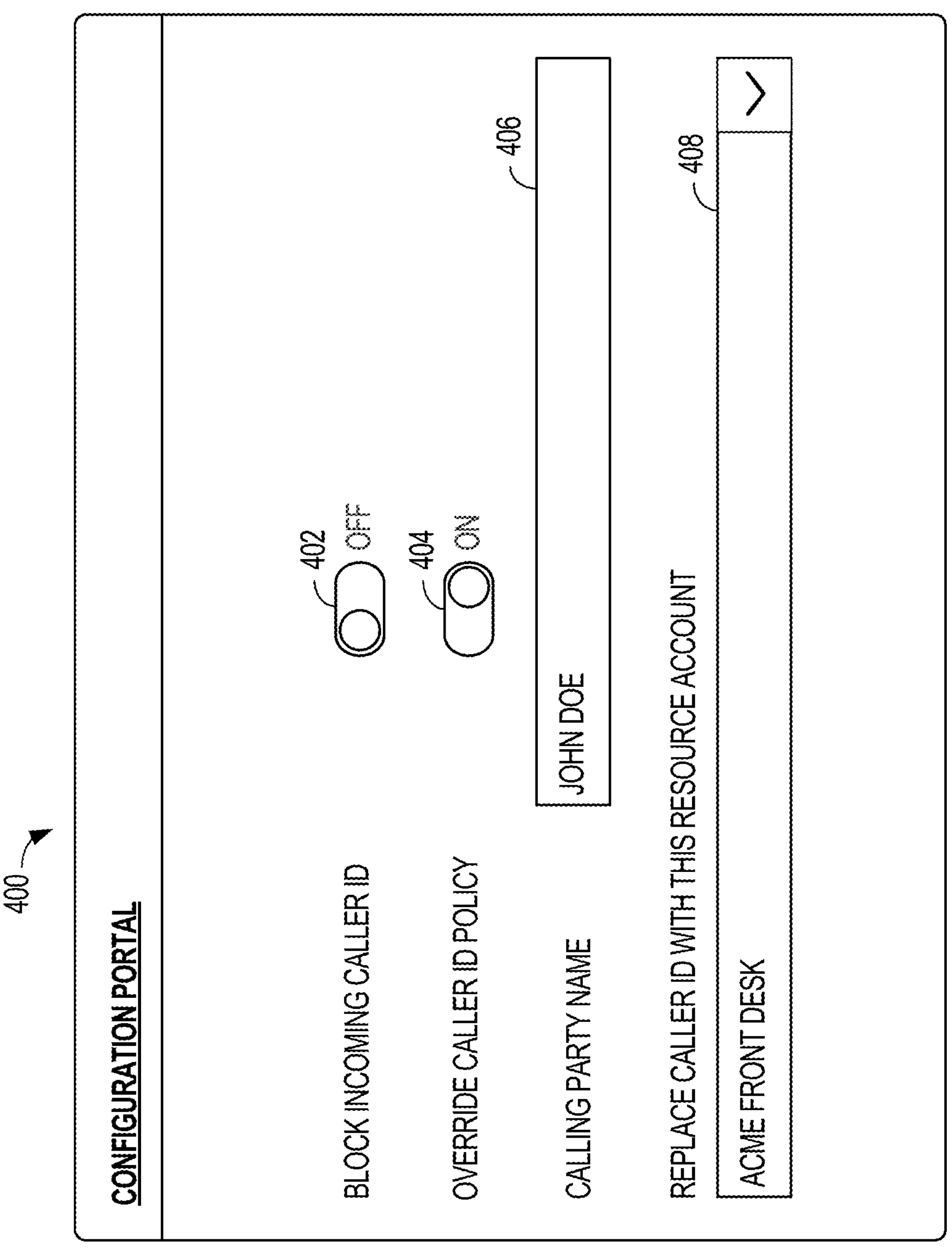
FIG. 4 is user interface diagram for a user interface of a configuration portal, providing for the ability to configure a caller ID policy for use with a telephone device so that an alien phone number is displayed as a caller ID number, consistent with some embodiments.

FIG. 4 presents an exemplary user interface 400 provided by the configuration portal 206 or 306, which enables an administrative user to configure various settings, as part of a caller ID policy, pertaining to caller ID functionality. This interface 400 is designed to be intuitive, allowing the user to easily navigate and modify the caller ID settings as required for their telephony environment.

The user interface 400 prominently features options that allow the administrative user to manage how outbound calls are displayed to call recipients. One feature available to the user is the ability to override the default telephone number with an alternative telephone number that will be presented as the caller ID number. This is particularly useful when the administrative user wishes to present a unified caller ID for an organization, such as the main contact number, rather than the direct line of the individual caller.

In the interface 400, the administrative user can see a clear and concise layout with toggle switches and input fields. For instance, there is a toggle switch for "Block Incoming Caller ID," 402 which can be turned on or off depending on whether the user wants to block the caller ID for incoming calls. Another toggle switch labeled "Override Caller ID Policy" 404 allows the user to activate or deactivate the overriding of the default caller ID number.

Additionally, there are input fields where the administrative user can enter specific information, such as the "Calling Party Name" 406, which allows for the customization of the name that appears on the recipient's caller ID display. The field labeled "Replace Caller ID with This Resource Account" 408 is where the user can input the alternative number that will replace the telephone number of the device as the caller ID number. This field is accompanied by a dropdown menu or a search function, enabling the user to select from a list of pre-configured resource accounts or enter a new number.

Figure 5:
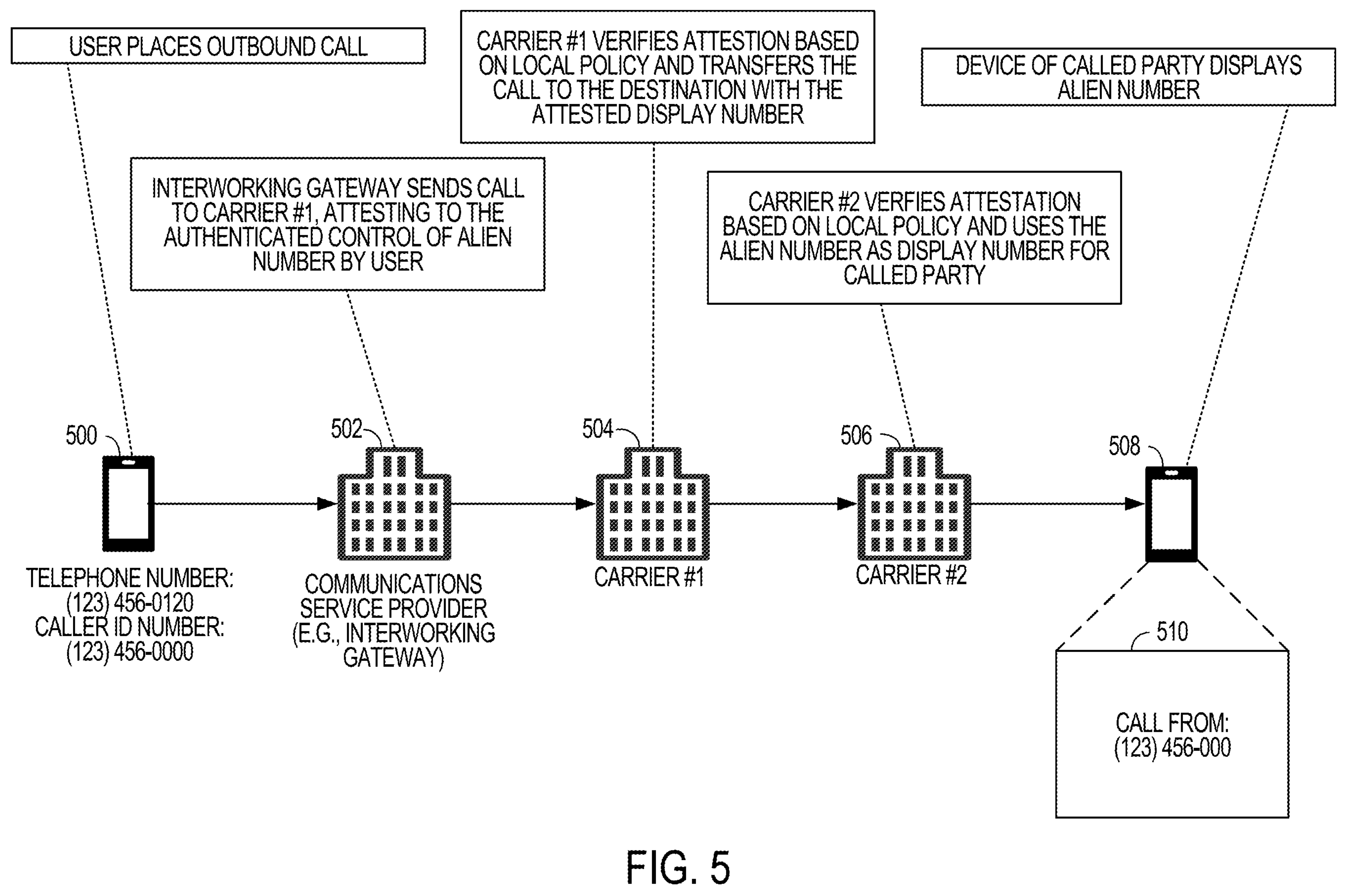
FIG. 5 is a call flow diagram illustrating the process by which a call originating from a device with an authorized alien caller ID is routed through an interworking gateway, and various carriers, to a device of a called party, at which the verified alien caller ID is displayed, according to some embodiments.

FIG. 5 illustrates the process by which a telephone device 500, subsequent to a caller ID policy being activated for a user account, initiates an outbound call with an attested caller ID number. FIG. 5 shows the flow of communication between the telephone device 500, the communications service provider 502 serving as a interworking gateway, and the carriers 504 and 506 involved in the call routing and completion. The attestation indicator, which confirms the legitimacy of the caller ID number, can be communicated through various methods, including SIP protocols, SHAKEN framework, or delegated certificates. Each approach ensures that the attested caller ID number is recognized and trusted throughout the call path.

With some embodiments, the SIP protocols may be leveraged to communicate the attestation indicator during a call. In the SIP protocol method, when the telephone device 500 places an outbound call, the communications service provider 502, acting as an interworking gateway, includes SIP headers in the call setup messages. These headers carry the attestation indicator, which may be a specific value or set of values that signal the verification status of the caller ID number. As the call progresses through carrier #1 504 and potentially carrier #2 506, each carrier examines the SIP headers to verify the attestation level. If the attestation is confirmed, the carriers allow the call to proceed with the verified caller ID displayed to the call recipient's device 508, as shown with reference number 510.

Under a SHAKEN framework, the attestation indicator is a digital certificate that accompanies the call setup information. This certificate is based on the Secure Handling of Asserted information using toKENS (SHAKEN) standards and provides a cryptographically secure way to assert the calling party's right to use the caller ID number. When the telephone device 500 makes an outbound call, the communications service provider 502 attaches the SHAKEN certificate to the call. Carrier #1 504, upon receiving the call, validates the certificate against the SHAKEN framework's policies and, if validated, passes the call along with the attested caller ID to carrier #2 506, which also performs its verification before presenting the call to the recipient's device 508.

With delegated certificates, the attestation is managed through a certificate that the communications service provider issues to the customer, which delegates the right to use the caller ID number. This certificate is then presented to carrier #1 504 as part of the call setup. Carrier #1 504 checks the certificate against its own policies or a central certificate repository to confirm its validity. Once the certificate is verified, carrier #1 and any subsequent carriers in the call path recognize the attestation and maintain the verified caller ID for the duration of the call.

In all three methods, the attestation indicator serves as a trusted credential that accompanies the call metadata, ensuring that each carrier in the call path can independently verify the authenticity of the caller ID number. This process is helps to prevent caller ID spoofing and ensuring the integrity of caller identification across the telephony network.

While the description and various examples as presented herein have thus far addressed the verification of "telephone numbers" for use in caller ID services, it is important to note that the underlying principles and mechanisms described herein may be applicable to a broader range of identifiers in alternative implementations. The described verification process, including the generation and verification of a secret code and API requests, could be adapted to validate control over various types of digital identifiers, such as email addresses, distribution aliases, user IDs, and other forms of identification used in electronic communications.

Machine and Software Architecture

Figure 6:
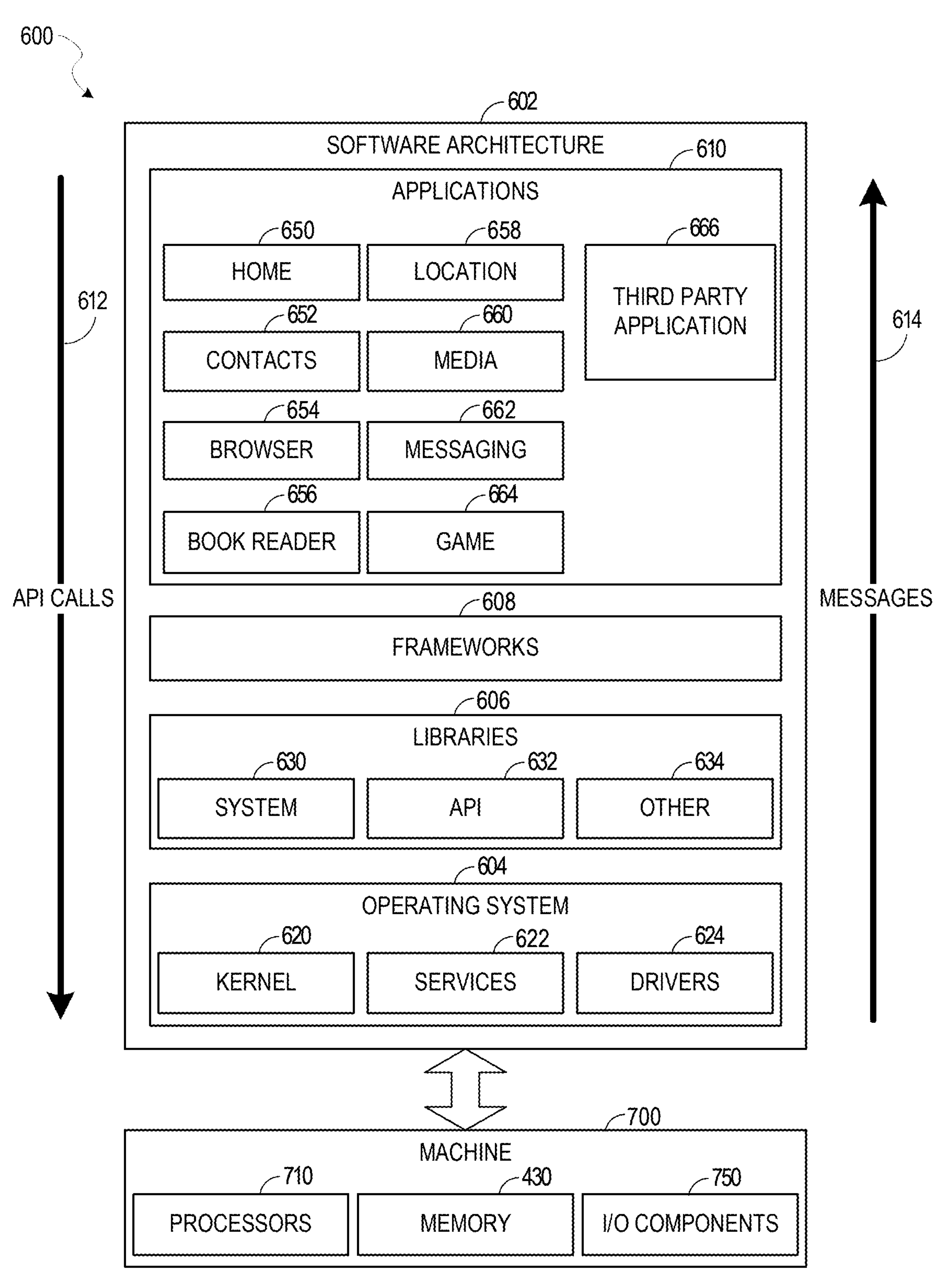
FIG. 6 is a block diagram illustrating a software architecture, which can be installed on any of a variety of computing devices to perform methods consistent with those described herein.

FIG. 6 is a block diagram 600 illustrating a software architecture 602, which can be installed on any of a variety of computing devices to perform methods consistent with those described herein. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 802 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4). Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various GUI functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 612 provided by the operating system 604 to facilitate functionality described herein.

Figure 7:
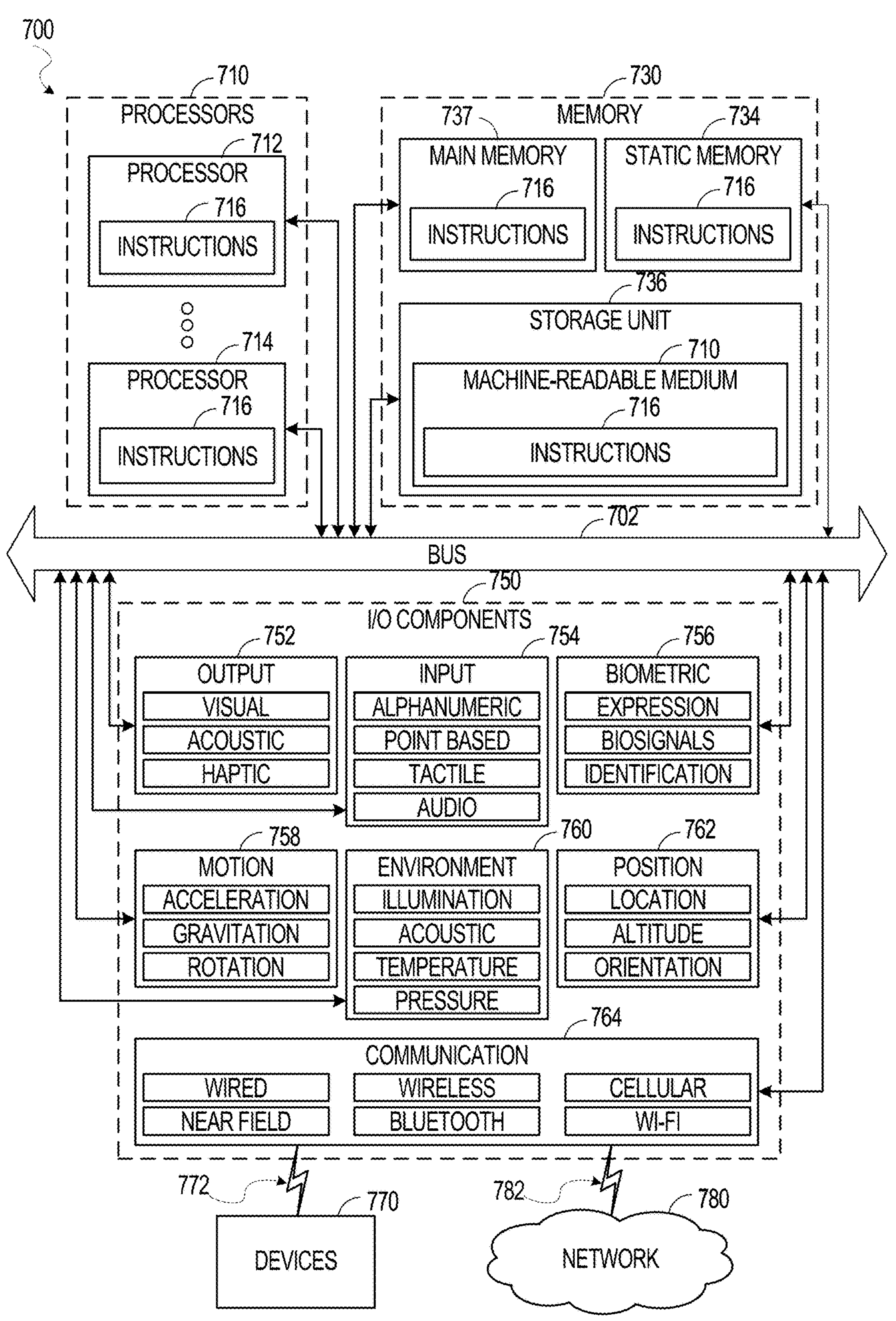
FIG. 7 illustrates a diagrammatic representation of a machine in the form of a computer system (e.g., a server computer) within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions 716 may cause the machine 700 to execute any one of the methods or algorithmic techniques described herein. Additionally, or alternatively, the instructions 716 may implement any one of the systems described herein. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 may include a main memory 732, a static memory 734, and a storage unit 736, all accessible to the processors 710 such as via the bus 702. The main memory 730, the static memory 734, and storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 710, environmental components 760, or position components 762, among a wide array of other components. For example, the biometric components 756 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The V/O components 550 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or storage unit 736 may store one or more sets of instructions and data structures (e.g., software) embodying or utilized by any one or more of the methodologies or functions described herein. These instructions (e.g., the instructions 716), when executed by processor(s) 710, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks: magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A computer-implemented method comprising:

providing, by a computer system comprising a configuration portal accessible to customers of a communication service provider, an interface for specifying a caller identification (ID) policy;

receiving, by the computer system via the configuration portal, a configuration setting for the caller ID policy, the configuration setting indicating that a telephone number is to be used as a caller ID number for calls originating from a device of a user logged into a user account;

performing, by the computer system, a telephone number verification procedure to verify that the telephone number is authorized for use as the caller ID number, according to the policy, for calls originating from a device of the user logged into the user account; and in response to verifying that the telephone number is authorized for use as the caller ID number for calls originating from a device of the user logged into the user account, i) activating the caller ID policy for the user account, and ii) generating, by the computer system, an attestation indicator signifying that the telephone number is verified for use as the caller ID number for calls originating via a device of the user associated with the user account; and processing an outbound call originating from a device of the user of the user account by transmitting the generated attestation indicator to a gateway device of a carrier, the gateway device of the carrier to convey the attestation of the telephone number for use as the caller ID number via a public switched telephone network.

2. The computer-implemented method of claim 1, wherein performing the telephone number verification procedure comprises:

receiving at the computer system via the configuration portal an entity identifier;

communicating, by the computer system, an application programming interface (API) request to a telephone number verification service, the API request including the entity identifier and the telephone number, wherein the telephone number verification service is configured to access customer data records to confirm existence of a relationship between the entity identifier and the telephone number; and in response to communicating the API request, receiving, by the computer system from the telephone number verification service, a confirmation indicating existence of the relationship between the entity identifier and the telephone number.

3. The computer-implemented method of claim 1, wherein performing the telephone number verification procedure comprises:

presenting, by the computer system via the configuration portal, a secret code;

receiving, by the computer system, an indication that the secret code has been provided to a telephone number verification service as a setup procedure for processing application programming interface (API) requests;

receiving at the computer system via the configuration portal an entity identifier;

communicating, by the computer system, an API request to the telephone number verification service, the API request including the secret code, the entity identifier, and the telephone number, wherein the telephone number verification service is configured to access customer data records to confirm existence of a relationship between a customer associated with the entity identifier and the telephone number only if the secret code received via the API request matches the secret code previously provided to the telephone number verification service.

4. The computer-implemented method of claim 3, wherein the telephone number verification service is configured to process the API request by accessing only those customer data records that are associated with the secret code provided with the API request.

5. The computer-implemented method of claim 1, wherein processing the outbound call originating from the device of the user of the user account further comprises:

transmitting the generated attestation indicator to a gateway device of a carrier utilizing a Session Initiation Protocol (SIP) header during a call setup phase.

6. The computer-implemented method of claim 1, wherein performing the telephone number verification procedure comprises:

initiating, by an integrated voice response (IVR) unit, an outbound telephone call to the telephone number;

detecting, by the IVR unit, an answer to the outbound telephone call;

playing, by the IVR unit, an audible message to a call recipient that includes instructions for verifying control over the telephone number, the instructions prompting the call recipient to provide a verification input comprising at least one of a spoken command recognizable by the IVR unit or Dual-Tone Multi-Frequency (DTMF) tones entered via a keypad of a second device;

receiving, by the IVR unit, the verification input; and confirming, by the IVR unit, that the received verification input is a specified input required for verification, and upon confirmation, transmitting a verification result signal to the computer system, the verification result signal indicating that the telephone number is authorized for use as the caller ID number, according to the policy, for calls originating from a device of the user logged into the user account.

7. The computer-implemented method of claim 1, wherein the telephone number verification procedure further comprises:

presenting, by the computer system via a configuration portal interface, a secret code;

placing, by an integrated voice response (IVR) unit, an outbound call to the telephone number;

in response to detecting, by the IVR unit, an answer to the outbound telephone call, prompting for a user input of the secret code, wherein the prompting allows for the secret code to be provided through at least one of voice commands or Dual-Tone Multi-Frequency (DTMF) tones;

receiving, by the IVR unit, a user input;

determining, by at least one of the IVR unit or the computer system, that the user input matches the secret code presented; and verifying, based on the determination that the user input matches the secret code, that the telephone number is authorized for use as the caller ID number, according to the policy, for calls originating from a device of the user logged into the user account.

8. The computer-implemented method of claim 1, further comprising:

receiving, by the computer system via the configuration portal, instructions for an integrated voice response (IVR) unit to navigate a menu prompting system of an automated answering service associated with the telephone number;

wherein the telephone number verification procedure further comprises:

causing, by the computer system, the IVR unit to place a call to the telephone number;

utilizing, by the IVR unit, the received instructions to interact with the menu prompting system of the automated answering service by sending Dual-Tone Multi-Frequency (DTMF) tones to navigate through one or more menu options, causing the automated answering service to forward the call to a specified extension; and receiving, by the IVR unit, verification input from a call recipient who answered the call at the specified extension;

confirming, by the IVR unit, that the received verification input is a specified input required for verification, and upon confirmation, transmitting a verification result signal to the computer system, the verification result signal indicating that the telephone number is authorized for use as the caller ID number, according to the policy, for calls originating from a device of the user logged into the user account.

9. A system comprising:

at least one processor;

a memory storage device storing instructions there on, which, when executed by the at least one processor, cause the system to perform operations comprising:

providing, by a computer system comprising a configuration portal accessible to customers of a communication service provider, an interface for specifying a caller identification (ID) policy;

receiving, by the computer system via the configuration portal, a configuration setting for the caller ID policy, the configuration setting indicating that a telephone number is to be used as a caller ID number for calls originating from a device of a user logged into a user account;

performing, by the computer system, a telephone number verification procedure to verify that the telephone number is authorized for use as the caller ID number, according to the policy, for calls originating from a device of the user logged into the user account; and in response to verifying that the telephone number is authorized for use as the caller ID number for calls originating from a device of the user logged into the user account, i) activating the caller ID policy for the user account, and ii) generating, by the computer system, an attestation indicator signifying that the telephone number is verified for use as the caller ID number for calls originating via a device of the user associated with the user account; and processing an outbound call originating from a device of the user of the user account by transmitting the generated attestation indicator to a gateway device of a carrier, the gateway device of the carrier to convey the attestation of the telephone number for use as the caller ID number via a public switched telephone network.

10. The system of claim 9, wherein performing the telephone number verification procedure comprises:

receiving at the computer system via the configuration portal an entity identifier;

communicating, by the computer system, an application programming interface (API) request to a telephone number verification service, the API request including the entity identifier and the telephone number, wherein the telephone number verification service is configured to access customer data records to confirm existence of a relationship between the entity identifier and the telephone number; and in response to communicating the API request, receiving, by the computer system from the telephone number verification service, a confirmation indicating existence of the relationship between the entity identifier and the telephone number.

11. The system of claim 9, wherein performing the telephone number verification procedure comprises:

presenting, by the computer system via the configuration portal, a secret code;

receiving, by the computer system, an indication that the secret code has been provided to a telephone number verification service as a setup procedure for processing application programming interface (API) requests;

receiving at the computer system via the configuration portal an entity identifier;

communicating, by the computer system, an API request to the telephone number verification service, the API request including the secret code, the entity identifier, and the telephone number, wherein the telephone number verification service is configured to access customer data records to confirm existence of a relationship between a customer associated with the entity identifier and the telephone number only if the secret code received via the API request matches the secret code previously provided to the telephone number verification service.

12. The system of claim 11, wherein the telephone number verification service is configured to process the API request by accessing only those customer data records that are associated with the secret code provided with the API request.

13. The system of claim 12, wherein processing the outbound call originating from the device of the user of the user account further comprises:

transmitting the generated attestation indicator to a gateway device of a carrier utilizing a Session Initiation Protocol (SIP) header during a call setup phase.

14. The system of claim 9, wherein performing the telephone number verification procedure comprises:

initiating, by an integrated voice response (IVR) unit, an outbound telephone call to the telephone number;

detecting, by the IVR unit, an answer to the outbound telephone call;

playing, by the IVR unit, an audible message to a call recipient that includes instructions for verifying control over the telephone number, the instructions prompting the call recipient to provide a verification input comprising at least one of a spoken command recognizable by the IVR unit or Dual-Tone Multi-Frequency (DTMF) tones entered via a keypad of a second device;

receiving, by the IVR unit, the verification input; and confirming, by the IVR unit, that the received verification input is a specified input required for verification, and upon confirmation, transmitting a verification result signal to the computer system, the verification result signal indicating that the telephone number is authorized for use as the caller ID number, according to the policy, for calls originating from a device of the user logged into the user account.

15. The system of claim 9, wherein the telephone number verification procedure further comprises:

presenting, by the computer system via a configuration portal interface, a secret code;

placing, by an integrated voice response (IVR) unit, an outbound call to the telephone number;

in response to detecting, by the IVR unit, an answer to the outbound telephone call, prompting for a user input of the secret code, wherein the prompting allows for the secret code to be provided through at least one of voice commands or Dual-Tone Multi-Frequency (DTMF) tones;

receiving, by the IVR unit, a user input;

determining, by at least one of the IVR unit or the computer system, that the user input matches the secret code presented; and verifying, based on the determination that the user input matches the secret code, that the telephone number is authorized for use as the caller ID number, according to the policy, for calls originating from a device of the user logged into the user account.

16. The system of claim 9, further comprising:

receiving, by the computer system via the configuration portal, instructions for an integrated voice response (IVR) unit to navigate a menu prompting system of an automated answering service associated with the telephone number;

wherein the telephone number verification procedure further comprises:

causing, by the computer system, the IVR unit to place a call to the telephone number;

utilizing, by the IVR unit, the received instructions to interact with the menu prompting system of the automated answering service by sending Dual-Tone Multi-Frequency (DTMF) tones to navigate through one or more menu options, causing the automated answering service to forward the call to a specified extension; and receiving, by the IVR unit, verification input from a call recipient who answered the call at the specified extension;

confirming, by the IVR unit, that the received verification input is a specified input required for verification, and upon confirmation, transmitting a verification result signal to the computer system, the verification result signal indicating that the telephone number is authorized for use as the caller ID number, according to the policy, for calls originating from a device of the user logged into the user account.

17. A system comprising:

means for providing an interface for specifying a caller identification (ID) policy;

means for receiving a configuration setting for the caller ID policy, the configuration setting indicating that a telephone number is to be used as a caller ID number for calls originating from a device of a user logged into a user account;

means for performing a telephone number verification procedure to verify that the telephone number is authorized for use as the caller ID number, according to the policy, for calls originating from a device of the user logged into the user account; and in response to verifying that the telephone number is authorized for use as the caller ID number for calls originating from a device of the user logged into the user account, i) means for activating the caller ID policy for the user account, and ii) means for generating an attestation indicator signifying that the telephone number is verified for use as the caller ID number for calls originating via a device of the user associated with the user account; and means for processing an outbound call originating from a device of the user of the user account by transmitting the generated attestation indicator to a gateway device of a carrier, the gateway device of the carrier to convey the attestation of the telephone number for use as the caller ID number via a public switched telephone network.

18. The system of claim 17, further comprising:

means for receiving an entity identifier;

means for communicating an application programming interface (API) request to a telephone number verification service, the API request including the entity identifier and the telephone number, wherein the telephone number verification service is configured to access customer data records to confirm existence of a relationship between the entity identifier and the telephone number; and in response to communicating the API request, means for receiving a confirmation indicating existence of the relationship between the entity identifier and the telephone number.

19. The system of claim 17, further comprising:

means for presenting a secret code;

means for receiving an indication that the secret code has been provided to a telephone number verification service as a setup procedure for processing application programming interface (API) requests;

means for receiving an entity identifier;

means for communicating an API request to the telephone number verification service, the API request including the secret code, the entity identifier, and the telephone number, wherein the telephone number verification service is configured to access customer data records to confirm existence of a relationship between a customer associated with the entity identifier and the telephone number only if the secret code received via the API request matches the secret code previously provided to the telephone number verification service.

20. The system of claim 19, wherein the telephone number verification service is configured to process the API request by accessing only those customer data records that are associated with the secret code provided with the API request.

* * * * *